Sept. 5, 1939.   E. FRIEDLÄNDER   2,172,197
POLYPHASE TRANSFORMER CONNECTION
Filed Nov. 12, 1937
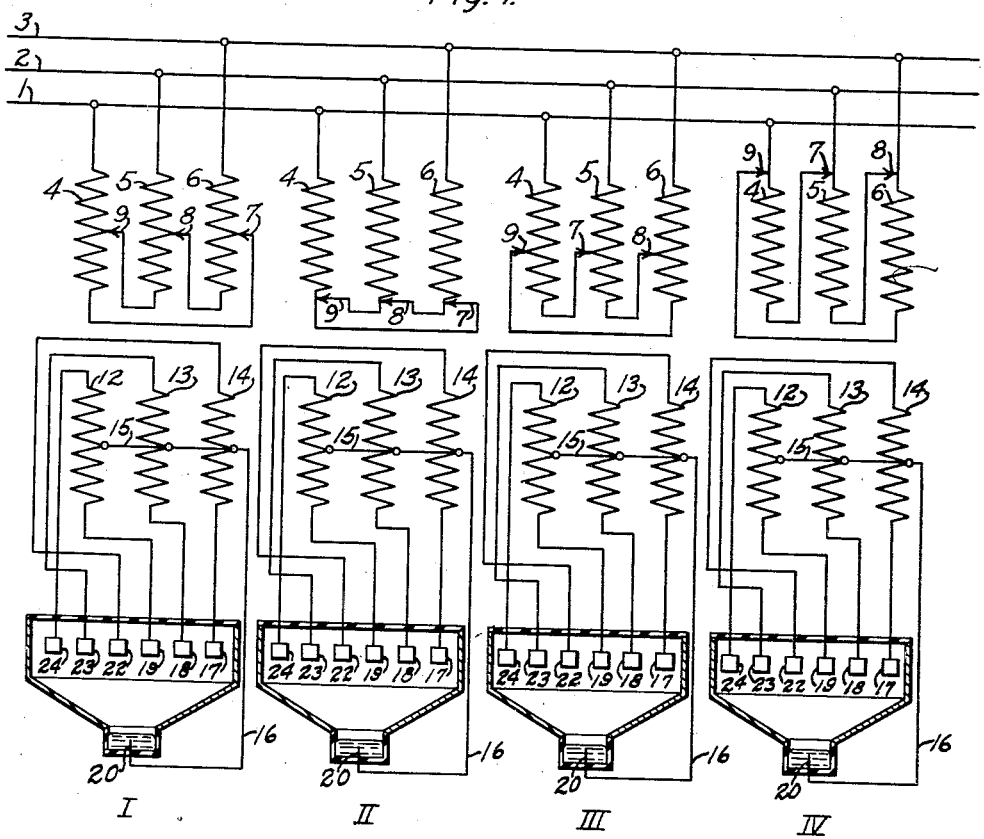

Patented Sept. 5, 1939

2,172,197

UNITED STATES PATENT OFFICE

2,172,197

POLYPHASE TRANSFORMER CONNECTION

Erich Friedländer, Berlin-Siemensstadt, Germany, assignor to Westinghouse Electric & Manufacturing Company, East Pittsburgh, Pa., a corporation of Pennsylvania Application November 12, 1937, Serial No. 174,198
In Germany March 11, 1937

3 Claims. (Cl. 175—363)

My invention relates to an arrangement of polyphase transformers for supplying power to a plurality of rectifier units.

The object of my invention is the provision of a simplified transformer connection for supplying power to a plurality of rectifier units that is economical in the use of copper and that compensates the harmonics produced by the rectifier.

For example, in order to compensate the harmonics produced by a six-phase rectifier, it is customary to provide a battery of a number of rectifiers, usually four in number, each supplied with power from a common power circuit through a transformer individual to the rectifier unit. The connections of the several transformers that feed the rectifiers have been so adjusted that the anode potentials of the transformers have been displaced with reference to each other by 0, ±15, and 30°. To accomplish this phase displacement, it is customary to connect the primary winding of the first unit in star, the next two in oblique zig-zag star with a ±15° phase shift, and the last in delta. The secondary winding of each transformer is connected to supply an individual six-phase rectifier unit.

In accordance with my invention, the oblique zig-zag connection is replaced by a compound star-delta connection in which the ends of the individual primary phase windings opposite those connected directly to the power circuit phase conductors are provided with tap connections, the terminal points of which are connected to points on an adjacent phase winding, so that the connection between power circuit conductors may be a combination of the usual star and the usual delta connections. By this arrangement there is a considerable saving in copper used in the transformer units.

Referring to the drawing, Figure 1 is a diagrammatic view of circuits and apparatus constituting one preferred embodiment of the invention, and Figs. 2, 3, 4 and 5 are vector diagrams illustrating the voltage phase relation between the several primary windings.

In Figure 1 of the drawing, a three-phase power circuit is provided, represented by conductors 1, 2 and 3, to which are connected, respectively, corresponding ends of the primary phase windings 4, 5 and 6 of each of four transformer units, the secondary windings of which are used to supply power to four rectifiers, the several complete transformer and rectifier units being indicated at I, II, III and IV. The upper ends of each of the several phase windings 4, 5 and 6 of the transformer units are connected, respectively, to power circuit conductors 1, 2 and 3 and the lower ends thereof are provided with tap connections 7, 8 and 9 for connection to adjacent primary phase windings at convenient points. In unit I, it will be noted that the lower end of the winding 4 is connected through tap connection 7 to an intermediate point on the phase winding 6, the lower end of the phase winding 5 is connected through tap connection 9 to an intermediate point on the phase winding 4, and the lower end of winding 6 is connected through tap connection 8 to an intermediate point on the phase winding 5. In the second unit II, the several tap connections 7, 8 and 9 are connected to the lower ends of the same windings, respectively, as shown in unit I forming a star connection.

In unit III it will be observed that the connections are in general similar to those shown in unit I, excepting that the phase rotation is reversed. That is, the lower end of the winding 4 is connected by tap 7 to an intermediate point on the adjacent phase winding 5 instead of to an intermediate point on the phase winding 6, as in the first unit. The lower end of the phase winding 5 is connected by the tap connection 8 to an intermediate point on the phase winding 6 and the lower end of the phase winding 6 is connected by a tap connection 9 to an intermediate point on the phase winding 4. In unit IV, the several tap connections 7, 8 and 9 are connected, respectively, to the same windings as shown in unit III but to the upper ends of these several windings resulting in a delta connection between them.

Each of the units I, II, III and IV are provided with like secondary windings 12, 13 and 14, the mid-points of which are connected together by neutral conductor 15 to provide a six-phase supply to the associated rectifier units, the anodes 17, 18, 19, 22, 23 and 24 of which are connected to the outer ends of the several star connected secondary windings and the mid-point 15 of which is connected by conductor 16 to the common terminal 20.

Referring to Figs. 2, 3, 4 and 5, which are vector representations of the voltage relationship of the primary winding units I, II, III and IV, respectively, of Fig. 1, the direction of the dotted lines 4, 5 and 6 in each of these four figures indicate the voltage vector relation of the voltages applied to the primary windings 4, 5 and 6 of the several transformer units. The numerals 1, 2 and 3 in each of the vector diagrams represent the power circuit phase conductors 1, 2 and 3 of Fig. 1 to which the several primary phase windings of the transformers are connected.

It will be noted that in the delta connection of Fig. 5, corresponding to unit IV, the several voltage vectors in the windings 4, 5 and 6 are displaced 30° in a counterclockwise direction from the corresponding vectors in the star connection of Fig. 3 corresponding to unit II of Fig. 1. It will also be noted that the vector 5, for example, in Fig. 4 is swung around the point 2 in a counterclockwise direction at an angle of 15° from the position of vector 5 in Fig. 3, and that the remaining vectors 4 and 6 are correspondingly rotated about the points 1 and 3, respectively, indicating a phase shift in each of the three primary windings of +15° from the position shown in Fig. 3. It will also be noted with reference to Fig. 2 representing the voltage vectors in the primary windings of unit I in Fig. 1, that the vector 5 is shifted —15° about the point 2, that is, in a counter-clockwise direction from its position represented in Fig. 3 and that the remaining vectors 4 and 6 are correspondingly rotated about points 1 and 3, respectively, in the same direction indicating a —15° shift in phase rotation with respect to that shown in Fig. 3.

By use of the compound star-delta connection on the primary side of the transformers it will be seen that one of the transformers rotates the fundamental flux with reference to the primary potential by +15° and the other by —15°, so that the secondary potentials are rotated with reference to those of the two transformers of units I and III, respectively, by +15° and —15°. For this purpose the number of turns which are connected between the network conductor and the tap points 7, 8 and 9 should bear the ratio of $$\frac{1}{\sqrt{3}}$$

to the number of turns which are located between the taps and the terminal points of the winding. In this manner the condition is attained in the illustrated connections that the harmonic current produced in the network represented by conductors 1, 2 and 3 by the rectifiers of the four units compensate each other for equal magnitudes of the rectifier. This is particularly true of the fifth, seventh, eleventh and thirteenth harmonics.

The transformer supplying unit II does not rotate the fundamental flux which remains at zero relation with reference to the primary potential of the circuit comprising conductors 1, 2 and 3, and the transformer connected to unit IV rotates the fundamental flux with reference to the primary potential by +30°, so that the secondary potentials are correspondingly rotated.

The phase displacements of 15° intervals are illustrative only as any other phase displacement may be employed, if desired, by changing the position of the tap connections 7, 8 and 9 on the respective windings. With four rectifier units supplied by three-phase power, and the phase relations of the primary winding shifted 15°, it will be seen that the resulting phase relations of the twelve primary windings of the four transformer units result in twelve equally spaced vectors displaced 15° over an angle of 180° and that with the use of six-phase secondaries this results in twenty-four equally spaced vectors spaced 15° apart over 360°.

As will be apparent from the principle of the invention described, other installations having different numbers of rectifier units may be employed, and different degrees of phase rotation may be provided for by properly selecting the ratio of the star and delta portions of the star-delta combination connection.

Many modifications may be made in the detailed connections and apparatus illustrated and described, and I do not wish to be limited otherwise than by the scope of the appended claims.

I claim as my invention:

1. A polyphase connection for transformers supplying power to a plurality of polyphase rectifiers comprising a polyphase power circuit, a separate polyphase transformer for each rectifier unit, each transformer having primary and secondary polyphase windings, the primary phase windings of the several units being progressively advanced from simple star to simple delta to effect a progressive phase displacement between consecutive units, one end of the corresponding phase winding of each of the primary windings being connected to the same power circuit conductor, the opposite ends of the several primary phase windings being provided with tap connections to the next phase winding, the corresponding tap connections for a single transformer unit being connected to like points on the several windings, the tap connections on certain of said transformer units being made in reverse phase displacement to the tap connections on other transformer units.

2. A polyphase connection for supplying power to an even number of polyphase rectifiers comprising a polyphase power circuit and a separate transformer for each rectifier unit, each transformer having a three-phase primary and a six-phase secondary winding, the several primary windings having one end of the corresponding phase windings connected to the same power circuit phase conductor, the opposite ends of the several windings being provided with tap connections to the next phase winding, the tap connections on one half the transformer units being made in reverse phase displacement to the tap connections on the other half.

3. A polyphase connection for supplying power to an even number of polyphase rectifiers comprising a polyphase power circuit and a separate transformer for each rectifier unit, each transformer having a three-phase primary and a six-phase secondary winding, the several primary windings having one end of the corresponding phase windings connected to the same power circuit phase conductor, the opposite ends of the several windings being provided with tap connections to the next phase winding, the tap connections on one half the transformer units being made in reverse phase displacement to the tap connections on the other half, the primary windings of one unit being connected in star relation to power circuit, the primary windings of another unit being connected in delta relation to the power circuit to effect a thirty degree phase displacement, and the primary windings of the remaining units being connected in compound star-delta relation to effect differing degrees of phase displacement.

ERICH FRIEDLÄNDER.